United States Patent [19]
Wasilewski

[11] 3,768,973
[45] Oct. 30, 1973

[54] ENERGY COMPENSATED ENTHALPIMETER FOR PROCESS ANALYSIS

[76] Inventor: Joseph C. Wasilewski, 29 Melville Rd., Grovers Mill, R.D. No. 1, N.J. 08512

[22] Filed: Apr. 12, 1971

[21] Appl. No.: 133,193

[52] U.S. Cl............ 23/230 R, 23/230 A, 23/253 R, 23/253 A, 73/15 R, 73/190 R
[51] Int. Cl. .......................................... G01n 25/48
[58] Field of Search...................... 23/230 A, 253 A; 73/15, 190

[56] References Cited
UNITED STATES PATENTS
3,160,477  12/1964  Wasilewski ............................ 23/253
3,276,843  10/1966  Cooper, Jr. ............................ 23/230

Primary Examiner—Morris O. Wolk
Assistant Examiner—R. E. Serwin
Attorney—Thomas B. Graham

[57] ABSTRACT

An instrument for determining the concentration of a chemical substance in a moving stream, such as the acid concentration from a metal cleaning process, or other chemical process, present in a flowing process fluid stream, which apparatus measures the heat of reaction of the flowing stream fluid by reacting an aliquot sample of it with a second fluid which is injected into said aliquot sample of the stream under process flow conditions, the instrument being enclosed in a selectively controlled environment. The temperature rise in the aliquot sample and the energy change to a compensating heater are measured with respect to elapsed time, thereby providing two gaussian curves for each aliquot. With the process fluid flushing the analytical cell continuously the net temperature change in the few minutes after reaction is completed in the analytical cell containing the aliquot sample of the process fluid is zero, a new aliquot of process fluid is in the cell, and a second analysis is performed within 1 to 2 minutes, depending on flow time and analytical cell volume.

13 Claims, 5 Drawing Figures

INVENTOR.
JOSEPH C. WASILEWSKI

BY *Thomas O. Graham*

ATTORNEY ial in process analysis of fluids under process pressure and temperature conditions utilizing the heat of reaction for the quantitative analysis. It is elementary that every chemical reaction is accompanied by a heat effect, either endothermic or exothermic. While it is possible to measure many phenomena by detecting a temperature change, or a conductivity change, or a pH change, and many such instruments exist for good quantitative control of continuously flowing process streams, it is desirable to approach fundamentals more closely.

ENERGY COMPENSATED ENTHALPIMETER FOR PROCESS ANALYSIS

BACKGROUND OF THE INVENTION

This invention is concerned with an instrument useful in process analysis of fluids under process pressure and temperature conditions utilizing the heat of reaction for the quantitative analysis. It is elementary that every chemical reaction is accompanied by a heat effect, either endothermic or exothermic. While it is possible to measure many phenomena by detecting a temperature change, or a conductivity change, or a pH change, and many such instruments exist for good quantitative control of continuously flowing process streams, it is desirable to approach fundamentals more closely.

Process fluids in many instances are routinely analyzed by the insertion of a probe such as pH probe into the fluid, whether it be a static system or a flowing fluid. Conductivity electrodes likewise can be used in fluids. The conductivity electrodes are often used in measuring, for example, the velocity of a stream. The photo cell is similarly useful where the fluid can be made to flow through a transparent section in a tube or pipe, and light can be used to detect some property of the fluid, such as its absorbance, or its turbidity, or its lack of turbidity. That is, virtually any physical property of the fluid can be used as the basis of a measurement. The problem is to obtain a good fundamental measure of the change in a property of the fluid stream in terms of an electrical property, which electrical property is the detectable parameter and which can be related to the solution concentration. Thus, absorbance, turbidity, conductivity, acidity, resistance, capacitance or even inductance of a solution are experimentally useful.

For recording purposes and, for example, in studying a continuously flowing process fluid stream and recording the process fluid concentration the very low level signal obtained from the detector must be amplified. Quite often the nature of the fluid is such that it is very viscous, turbid, or it contains particles such as would appear in a clay slurry. The detector is made inoperative in conventional combinations after a period of use, because the detector becomes contaminated, or stated differently, the detector output commences to give an erroneous response to the condition of the stream. The obvious example is the photo detector in responding to a particle present in a slurry rather than to the absorbance of the solution.

A good approach to quantitative measurements for quantitative process stream control can be made by measuring total energy change and it is, accordingly, a fundamental object of this invention to provide an instrument suited to such study of process fluids or flowing process streams.

It is another object of the invention to provide an instrument, properly designated an enthalpimeter, suitable for carrying out quantitative analyses on process streams on a total energy change basis.

It is another object of the invention to provide an instrument suitable for continuously or repeatedly analyzing aliquots of a flowing process fluid stream by directing a sample of that stream through a cell, reacting it in the cell, and detecting the thermal effects within the cell, thereby to obtain a measurement based on an energy analysis of the thus isolated system.

Other objects and advantages of the invention will in part be obvious and in part appear hereinafter.

DETAILED DESCRIPTION OF THE INVENTION

The present invention is concerned with an enthalpimeter which measures the total energy change of a detector cell in an isolated system, floating at a given energy level, and equipped to receive continuously a sample of the process fluid stream to be directed to and through the cell, wherein the contents of the cell are periodically subjected to the influence of a reactant, and in the combination the temperature change within the cell, (or the conductivity change within the cell) and the energy change in the cell at any preselected and controlled ambient temperature are simultaneously detected, recorded, and plotted, so that a true energy change measurement correlated with temperature change, correlated further with concentration of the process fluid stream can be made. With a dual sensing technique in the cell which is a carefully controlled atmosphere it is possible to provide two independent signals used in conjunction with each other.

Fundamental considerations involved in enthalpimetric analysis can be found in my publication in Analytical Chemistry 38, 1750, 1966, and Analytical Chemistry, 36, 11, October 1964 and U.S. Pat. No. 3,160,477.

In my present invention the sensor pair provides accurate response signals which are not affected by slurries, solution, color or viscosity. In addition to determination of the concentration of the process fluid the injected reactant can be determined instead. The heat of reaction $\Delta H$ can also be determined on two bases, the temperature rise in the cell and/or the heater energy (voltage change). This heater energy change is integrated in terms of watt seconds during the time interval characteristic with the chemical reaction and the analytical cell constant K.

DETAILS OF THE INVENTION

In accordance with the principles outlined the apparatus embodying the invention, its manner of operation and actual application to a process stream may be understood by the following description including the drawing where FIG. 1 is a diagrammatic representation of the apparatus relating it to a flowing process stream;

Figure 1:
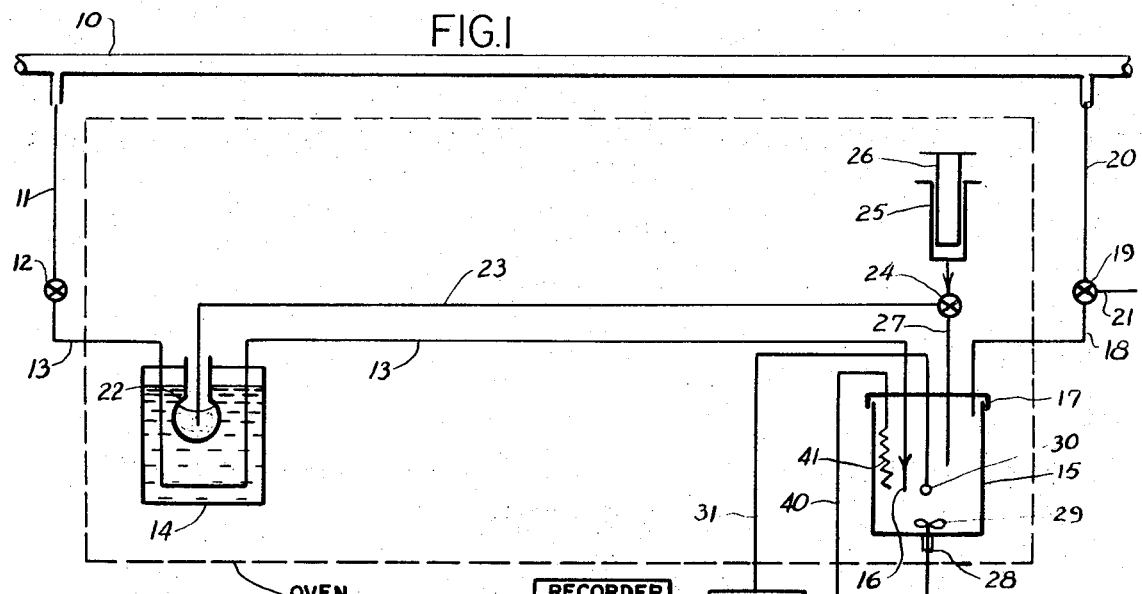

Referring now to FIG. 1, 10 represents a conduit for fluid in a process stream. It is understood that the term fluid is used in the broadest sense to include gases, suspensions of solid particles in gases, liquids, and suspensions of solid particles in liquids. In general, the reference is to any process fluid which might be encountered in any chemical process operation.

Tapped into a connecting point of the process fluid stream is sample line 11, controlled by valve 12, continuing through line 13 into and through a water bath 14 to a test cell 15. Discharge is aimed through the end 16 of line 13 near the bottom of the test cell. Exit through the top 17 of the cell is via line 18 controlled by valve 19 with return by line 20 to the process line 10. Should it be desired valve 19 can be made a three-way unit with discharge line 21 going to waste.

Analyzing reagent is taken from source 22 via line 23, valve 24 and syringe 25 with plunger 26 to be discharged via line 27 into test cell 15.

A stirrer motor drives shaft 28 which in turn rotates a blade impeller 29 in the cell. Alternatively, the stirring can be done by a magnetic action.

Temperature sensor or thermistor 30 is located in the cell above the stirrer and its electrical response signal carried by line 31 to bridge 32 to recorder 33, whose servo motor 34 rotates in response to temperature change in the cell. A potentiometer 35 is mechanically connected to the servo motor by coupling 36; potentiometer 35 is electrically connected by line 38 to power supply 39 which applies voltage through line 40 to heater 41 in cell 15. A second recorder 42 is connected to power supply 39 by line 42 and provides the voltage signal change in heater 40 due to a chemical reaction occurring in cell 15. In practical application recorders 33 and 43 are in a common enclosure which contains two amplifier-servo-pen systems which record the millivolt response from thermistor 30 and the heater response from heater 41 on a common time base chart paper.

Figure 4:
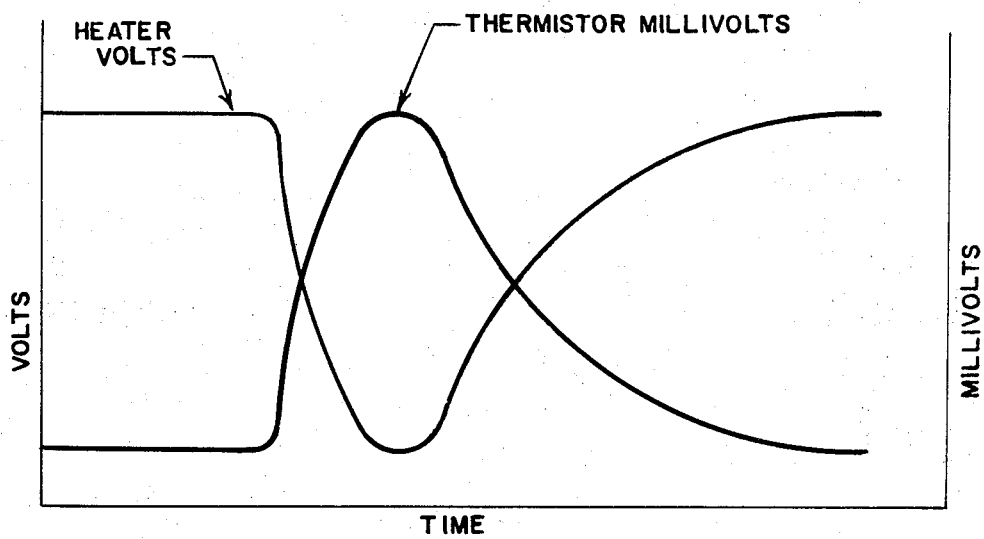
FIG. 4 is a plot of a pair of gaussian curves characteristic of those obtained in measurements done with this instrument.

A typical recorder plot for an exothermic reaction occurring in cell 15 is shown in FIG. 4. Two curves are available for each analysis the thermistor curve in millivolts and the heater curve in volts.

For purposes of carrying out the measurements to known ambient levels, the entire apparatus may be enclosed in a temperature controlled area, so indicated in the drawing.

A typical recorder plot for an exothermic reaction occurring in reactor cell 15 is shown in FIG. 4. Here the base line is time measured in seconds generally, and the ordinates are volts and millivolts. The two-pen recorder will show the thermistor temperature response, coordinating it with the millivolt ordinate scale and the heater voltage with the voltage scale. On the same time basis the two curves appear in a relationship essentially as shown in the FIGS. 4 and 5 as skewed Gaussian curves.

These Gaussian curves can be used to calculate the quantity of chemical substance reacted in cell 15, the heat of reaction $\Delta H$ can be calculated, and the rate of reaction can be determined.

Figure 5:
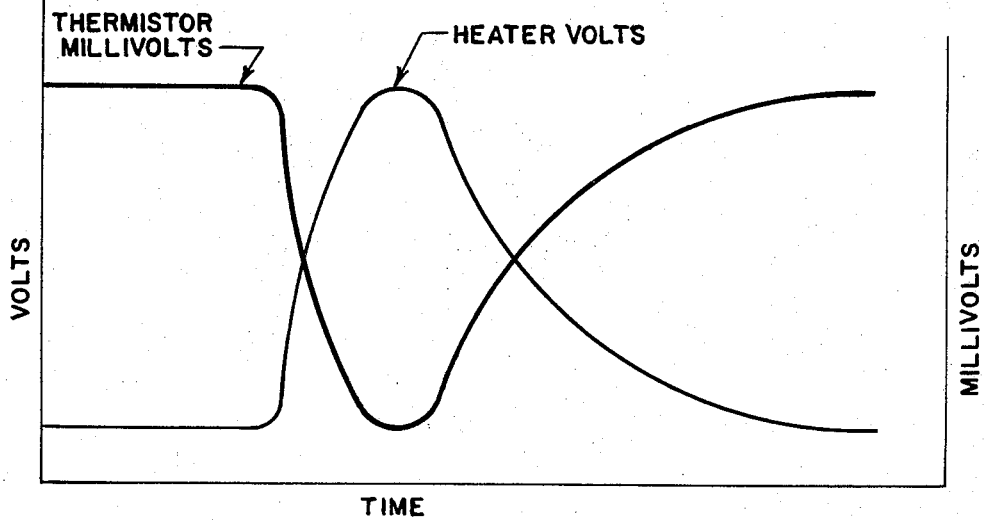
FIG. 5 is a similar plot of a pair of gaussian curves for a different type of reaction.

In FIG. 5 a similar relationship is shown with a pair of skewed Gaussian curves obtained in a endothermic reaction. The difference is merely in the orientation of curves at time zero which is the time the injected reagent enters the cell.

For example, in the determination of the concentration of a chemical process fluid such as the sulfuric acid concentration in a process tank or pipe which is connected to the enthalpimeter described herein through valves 12 and 19, the concentration of the acid would be read from the Gaussian curve described in FIG. 4 as the distance from the base line to the peak.

The curve obtained in FIG. 4 actually resulted from an experiment in which the sulfuric acid fluid was flowing through the enthalpimeter continuously, the instrument was in the energy compensated mode, and a solution of sodium hydroxide was injected into the aliquot of sulfuric acid contained in cell 15, using syringe 25. In a typical neutralization reaction such as the reaction between sulfuric acid and sodium hydroxide the instrument can measure acid concentrations approximately $5 \times 10^{-4}$ molar, or the equivalent caloric release in the cell 15 of approximately 0.10 calorie.

The inverse of the situation is equally susceptible to analytical determination. The alkali solution such as sodium hydroxide can be the process stream and the concentration of injected acid determined. When the instrument is used in this latter mode the flowing stream of sodium hydroxide becomes the analytical reagent 22 of FIG. 1 and its concentration, for example, can be a carefully standardized solution $1 \times 10^{-3}$ molar or any other suitable concentration expected in the unknown acid sample which will be injected into cell 15, using syringe 25.

Figure 2:
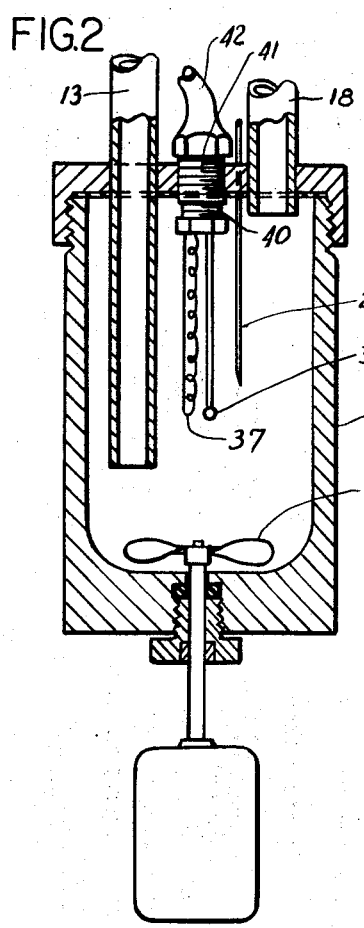
FIG. 2 is a section of a test cell showing it in detail.

In FIG. 2 the test cell 15 is shown in some detail. Generally, its material of construction will be of a nature suitable for the reaction to take place within it. Thus, it may have to be constructed of corrosive resistant stainless steel or it may be a polyethylene plastic or a glass unit in less demanding situations. It is essential only that it handle the pressure of the fluid stream and no extraneous reaction be introduced. The cell wall internally is shaped to induce thorough flushing of the cell by passing fluid entering through line 11 and exiting through line 18. Connection to the cell top may be a threaded or a welded connection depending on the material of construction.

The internal stirrer 29 may be a direct drive propeller style or a magnetic unit driven by a motor. The thermistor and heater assembly are provided through connection 40 which may be threaded through the cell top. The leads to heater and thermistor are brought out through cable connection 41–42.

Figure 3:
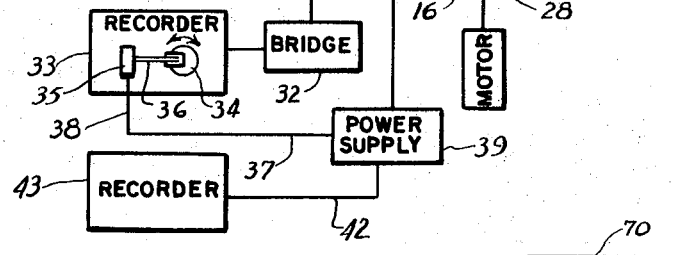
FIG. 3 is a circuit diagram showing the relationship of the cell temperature detection unit to the recorder.
Figure 3:
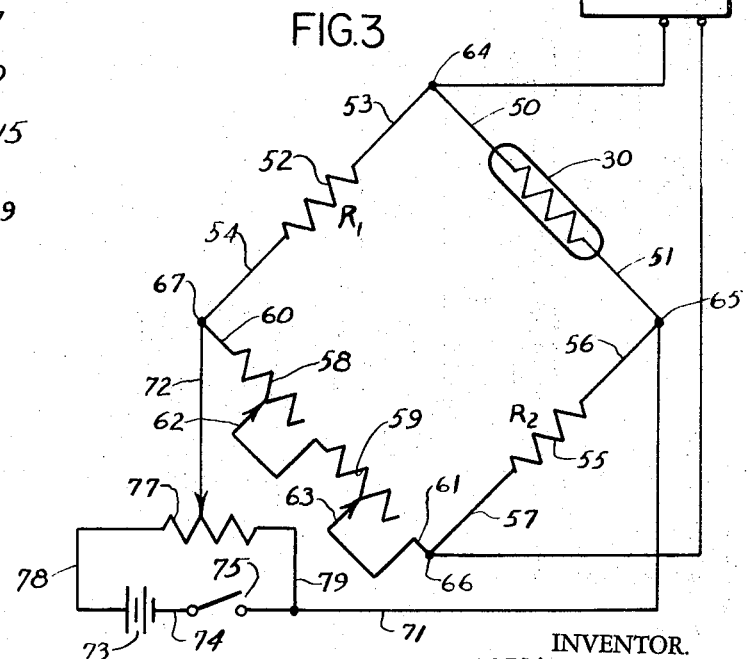

In FIG. 3 I have shown the circuit involving thermistor 30 incorporated into the bridge by its leads 50 and 51. The rest of the circuit is a typical bridge circuit consisting of resistor 52 connected by its leads 53 and 54 into the circuit of resistor 55 connected by its leads 56 and 57, variable resistors 58 and 59 connected by their leads 60 and 61 with respective balance variables 62 and 63. The bridge is connected through junctions 64, 65, 66 and 67 with opposite corners of the bridge 64 and 66 being connected to recorder 70 and corners 65 and 67 being connected by lines 71 and 72 to sensitivity circuit consisting of battery 73, lead 74, switch 75, lead 76, resistor 77 and lead 78. Essentially, the bridge circuit may be considered to be of a conventional character, but its detailed presentation is desirable to indicate the manner in which the thermistor is incorporated therein and temperature is measured.

The net result of either an exothermic or endothermic reaction occurring in the cell which contains an aliquot sample of the flowing stream when an analytical reagent at the same temperature is injected into the flowing stream is for a Gaussian type curve of temperature versus time to be plotted by recorder 1 connected to the bridge circuit and for a second Gaussian curve of heater voltage versus time to be plotted on recorder 2 connected to the power supply as shown in FIGS. 4 and 5. This thermistor-heater sensor pair provide a means for measuring the temperature swing and compensating any temperature change by utilizing a heater-power supply combination to return the temperature to the original temperature in the cell before the injected reagent was introduced. In this way the temperature rise $\Delta T$ and the heater energy change $\Delta V$ are recorded for each analysis; providing one signal in the millivolt range and a second signal in the voltage range. These are related to the heat of reaction and to the quantity of chemical substance reacted as follows:

$$\Delta T = Q/k = (\Delta H)N/K = (V_2 - V_1)$$

where
  $\Delta T$ is temperature change measured as millivolts
  $Q$ is the heat evolved as calories
  $N$ is the moles reacted
  $\Delta H$ is the heat of reaction
  $K$ is the heat capacity
  $V$ = voltage signal to heater
  $V_1$ and $V_2$, respectively, original and changed voltage signal The instrument thus provides two independent experimental data signals on which the quantitative analysis or the heat of reaction can be calculated or determined.

It is apparent that the instrument, as described herein, is thus adaptable to the measurement of reactants present in a chemical flowing stream under continuous conditions. That is, static conditions are not difficult to contend with, but continuous flow conditions impose requirements which the usual static techniques cannot match. By providing for the dual measurement of temperature increase and energy compensation within a cell, the cell being enclosed within a constant temperature oven independently controlled at an independent temperature level, it is possible to obtain dual signals correlated to the energy level of the process stream, essentially against a horizontal base, with one signal considerably amplified beyond the other. It is this amplification which provides a real advantage. In the measurement when carried out on a continuous basis, basic control is obtained by the rate at which process flow fluid is bled through line 13 into the reaction cell. The measured quantity of reactant injected into the cell produces a finite alteration of the condition thereof. The dual measurement is related to the time base and in a period of a finite interval of time, from a few seconds to several minutes, the cell is brought back to the energy level predetermined by the oven and the general conditions of the operation. In this way successive control measurements can be made and related to a single time base related to the process stream without correction for any alteration in its condition.

It will be apparent that the enthalpimeter can be used on a continuous basis; it can be used in a fixed volume without continuous flow and in a temperature rise technique.

The enthalpimeter can be used in three modes:
1. Energy compensated flowing stream as described above.
2. Energy compensated using a fixed volume in the cell but not flowing.
3. Temperature rise technique with a flowing stream; in this mode the heater power supply is not turned on and the temperature rise which occurs in the cell is measured by the thermistor and the solution temperature in the flowing cell slowly returns to the original process stream temperature as controlled by the oven. A time interval approaching 15 minutes or longer must be allowed between injections in this mode.

In a specific embodiment the present invention employs a thermistor-platinum heater pair when the enthalpimeter is used in the energy compensated mode. The thermistor is commercially available from several manufacturers; the heater can be a platinum resistance element available from Engelhardt Industries, Newark, N.J., or the element can be made from suitable platinum wire, or from manganin wire. When used as a "sensing pair" the assembly can detect temperature changes of 0.01° Centigrade and compensate the temperature rise in the cell in a time interval between a few seconds to 5 minutes, in the caloric range from 0.25 calorie to 25 calories or greater. The exact compensating time interval depends upon flow rate of the process fluid, the number of calories released or absorbed in the cell as a result of the chemical reaction (concentration) and the wattage of the compensating heater. In a typical experiment with water at a flow rate of 6.0 milliliters per minute into a 20 milliliter cell, using magnetic stirring, a caloric disturbance of 9.6 calories provided a thermistor response of 1.0 millivolt ( 0.38°C.) and a heater voltage response of 730 millivolts. The cell returned to the original baseline temperature and baseline energy level in about 90 seconds. A sodium hydroxide pellet weighing 0.15 milligram was reacted (dissolution) with the flowing water stream and provided a thermistor response of about 2.0 millivolts and a heater voltage response of 2.0 volts with a return to baseline in about 3 minutes.

It should be noted that the unknown stream and the injected analyzing reagent are interchangeable. That is, in FIG. 1 stream 10 or 27 can be unknown. Some of the chemical reaction systems of importance in industry for which the energy compensated enthalpimeter is useful as an analytical instrument for quantitative analysis and control are as follows:

| Type of reaction | Unknown stream | Injected analyzing reagent | Industrial significance |
| --- | --- | --- | --- |
| Proton transfer | HCl NaOH | KOH or NaOH HCl | Cleaning, acid hydrolysis dyes, soaps, pharmaceutical. |
| Chelation | Lead, copper, aluminum, calcium, magnesium, cadmiun, zinc. | EDTA | Pharmaceutical, metal etching waste waters. |
| Chelation | EDTA | Calcium, etc | Water analysis for hardness, sequestering capacity for detergent builders. |
| Diazotization | (Sulfanilamide) | (Sodium nitrite) | Pharmaceutical. |
| Redox | Hydrogen peroxide ammonium persulfate potassium dichromate. | (Solutions of metallic ions) | Chemicals, manufacturing, textiles, paper. |
| Redox | Metal ion in solution | Ammonium persulfate | Etch rate. |
| Precipitation | Barium chloride | Phosphoric acid containing sulfate ion. | Fertilizer manufacture. |
| Precipitation | Phosphoric acid containing sulfate ion. | Barium chloride | Fertilizer manufacture. |
| Other | Jet fuel (containing traces of water). | Silica gel or molecular sieve | Moisture analysis. |
|  | Alcoholic pyrogallol | Air or other gas | Oxygen conc. |

There are many gases which can be reacted with a flowing stream of solution, i.e. sulfur dioxide with water, ammoniacal cuprous chloride with carbon dioxide.

The curves shown in FIGS. 4 and 5 which result from one experiment provide in a single experiment information on the concentration of chemical substance reacted in the cell 15, or the concentration of substance present in flask 22. The curves of FIGS. 4 and 5 also provide information on the rate of chemical reaction (kinetics of the chemical reaction) and in addition provide information on the total number of calories released or absorbed in the cell 15 as a result of solution in cell 15 with solution injected into cell 15 using syringe 25.

The analyses of the curves of FIGS. 4 and 5 are performed as follows: The caloric release during the chemical reaction occurring in cell 15 is determined from FIGS. 4 and 5 by integration of either the Heater Volts curve or Thermistor Millivolts curve from the time the solutions originally react to the time the curves show return to the base line.

Note the typical curves as shown in either FIG. 4 or 5 as taken from the recorders 33 and 43 consist of a horizontal line representing a time interval during which no reaction occurs in the cell 15. The break in the curve leading to a sharp slope up in FIG. 4 in the Thermistor Millivolts curve and a sharp slope down in terms of the Heater Volts curve represents the point in time at which reactant is injected into the cell. Both curves approach asymptotes, pass through maximum, and then return to their original base line asymptotically. The slope of the Thermistor Millivolts curve from the first break to the maximum representing completion of the reaction is a measure of the rate of reaction. Similarly, the Heater Volts curves which is oppositely oriented is a measure of the rate of reaction. The area under the curve from the initial break to the point of return of the curve to its initial base line is a measure of the total amount of reaction.

The specific numerical application of the technique to any reaction or reactant combination indicated in the foregoing tabulation follows the usual calorimetric techniques of studying chemical reactions. It is important to observe that in the measurements in accordance with this invention whether they be exothermic or endothermic reactions as shown in FIGS. 4 and 5 involves a fixed size reactor, holding a certain energy level to fix an ambient temperature, and the reaction is conducted in the cell, and the total energy disturbance from its equilibrium condition before reaction to the time of its return to the initial equilibrium condition is measured in terms of the temperature change and the energy change necessary to bring this about.

Mathematically, the analysis of the curves for the kinetics of the reaction can be carried as follows:

Rate of Reaction = $dT/dt = dV/dt = (T_2-T_1)/t = (V_2-V_1)/t$ where
$dT/dt$ = rate of change of temperature with time
$dV/dt$ = rate of change of Heater Voltage with time
$T_2$ = Final Temperature (Peak Value)
$T_1$ = Original Temperature (Baseline Value)
$V_2$ = Final Heater Voltage (Peak)
$V_1$ = Original Heater Voltage (Baseline)

The time integral of this differential equation represents the area under the curve and is a measure of the calories released experimentally determined as (watts × sec)/4.18 = calories, (4.18 = Joule's Constant).

$$\text{Calories} = \int_{t_2}^{t_i} (dv/dt)$$

The quantitative analysis of either the flowing stream or the injected solution is available from the curves of FIGS. 4 and 5 by measuring of the voltage signal or millivolt signal from the baseline to the peak. The kinetics of the reaction are available from FIGS. 4 and 5 by measuring the rate of change of heater voltage or thermistor millivolt signals during the initial part of the Gaussian curves.

I claim:

1. An enthalpimeter for measuring the energy change of a first fluid contained in a closed cell of fixed volume at a given floating energy level due to the exothermic or endothermic heat of reaction from the reaction between the first fluid in the closed cell and an injected second fluid including means for adding the second fluid for reacting the fluid in the closed cell, voltage controlled heater means in the cell for compensating the temperature change in the closed cell so that upon completion of the chemical reaction in the closed cell, the closed cell temperature is returned to the original temperature of the fluid in the cell, said means for adding said second fluid reagent to the fluid in the cell for reaction therewith being at a preselected controlled temperature, whereby the resulting temperature change and energy change related to time provide two independent bases upon which to determine the heat of reaction of the two fluids, and the concentration of active chemical of said first fluid species in the cell or in the injected reagent.

2. The enthalpimeter in accordance with claim 1 wherein a flowing chemical process stream is diverted to provide an aliquot of first fluid to said closed cell for analysis therein, and wherein a known analytical reagent is injected into said closed cell as said second fluid.

3. The enthalpimeter in accordance with claim 2 wherein the process stream is known and meets an unknown fluid in said cell.

4. An apparatus in accordance with claim 1 wherein said closed cell can retain an elevated pressure.

5. An enthalpimeter as in claim 1 in which process fluid is conducted continuously into the analytical cell, flushing a prior analyzed aliquot sample and automatically providing a next aliquot sample for analysis.

6. An instrument in accordance with claim 1 for the determination of concentration or heat of reaction of fluid flowing continuously into the cell of the instrument wherein said temperature sensor is a thermistor-heater sensor pair in an electro-mechanical loop control circuit which provides two analytical signals for each analysis, one being a voltage signal Gaussian curve responding to the temperature change and the second being an independent curve of voltage signal responding to the heater energy level.

7. An enthalpimeter for concentration analysis as in claim 1 wherein the analyzing solution flows through the cell continuously and the sample whose concentration is to be determined is the injected sample.

8. An enthalpimeter as in claim 1 in which the injected analytical reagent is a gas.

9. An enthalpimeter in accordance with claim 1 in which the flowing stream is a gas.

10. A process enthalpimeter in accordance with claim 1 for providing a series of Gaussian curves, two for each analysis, which are a measure of the concentration of a chemical substance from a pressure tank or pipe, on a continuous basis wherein the flowing process fluid flushes the cell continuously, and an envelope of the peaks of the Gaussian curves provides a measure of the process fluid concentration changing with time.

11. An enthalpimetric process for measuring the caloric disturbance of a first fluid contained in a closed cell of fixed volume at a given floating energy level which comprises adding a second fluid for reacting the fluid in the closed cell with said second fluid, sensing the temperature change resulting in the closed cell due to the exothermic or endothermic heat of reaction from the reaction between first fluid in the closed cell and the injected second fluid, compensating the temperature change in the closed cell so that upon completion of the chemical reaction in the closed cell, the closed cell temperature is returned to the original temperature of the fluid in the cell, said second fluid reagent added to the fluid in the cell for reaction therewith being at a preselected controlled temperature, whereby the resulting temperature change and energy change related to time provide two independent bases upon which to determine the heat of reaction of the two fluids, and the concentration of active chemical of said first fluid species in the cell or in the injected reagent.

12. The process in accordance with claim 11 wherein a flowing chemical process stream is diverted to provide an aliquot of first fluid to said closed cell for analysis therein, and wherein a known analytical reagent is injected into said closed cell as said second fluid.

13. A process in accordance with claim 11 for providing a series of Gaussian curves, two for each analysis, which are a measure of the concentration of a chemical substance from a pressure tank or pipe, or a continuous basis wherein the flowing process fluid flushes the cell continuously, and an envelope of the peaks of the Gaussian curves provides a measure of the process fluid concentration changing with time.

* * * * *